May 9, 1933. W. S. BRINK 1,908,281
RIM
Filed Aug. 12, 1932 2 Sheets-Sheet 1

Winfield S. Brink Inventor

By Oly A Barrow

Attorneys

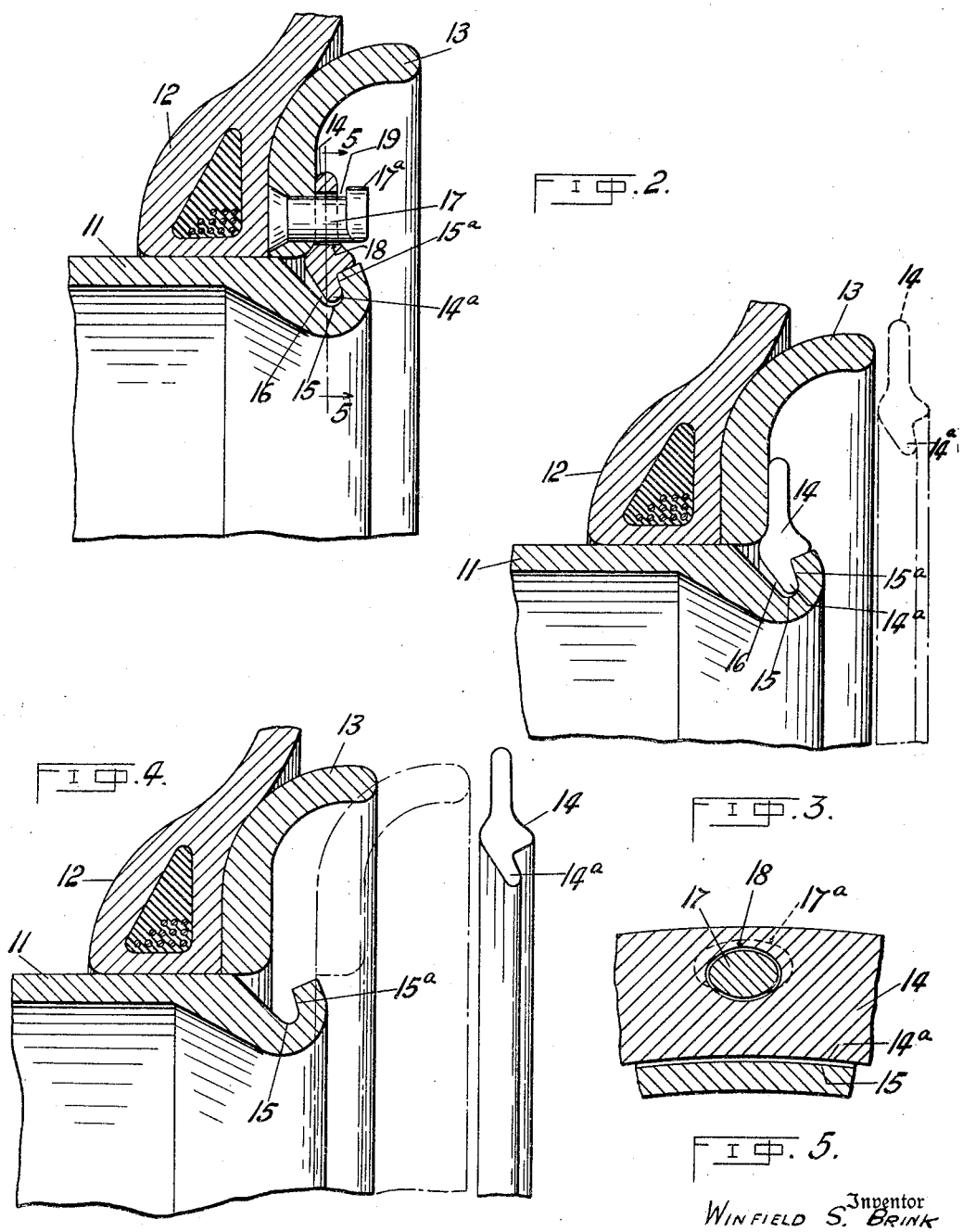

Patented May 9, 1933

1,908,281

UNITED STATES PATENT OFFICE

WINFIELD S. BRINK, OF AKRON, OHIO, ASSIGNOR TO THE FIRESTONE STEEL PRODUCTS COMPANY, OF AKRON, OHIO, A CORPORATION OF OHIO

RIM

Application filed August 12, 1932. Serial No. 628,478.

This invention relates to pneumatic tire carrying rims of the type having a removable side tire-retaining ring which is normally held in place by a locking ring which snaps into a gutter at the edge of the rim. The locking ring is inserted in the gutter when the tire is deflated and is held in place when the tire is inflated by the outward movement of the side ring caused by the pressure in the tire. Heretofore in this construction if the tire goes flat while in use the side ring has tended to slide sideways and thus allow the locking ring to spring out of the rim gutter which means the side ring and tire will be free to slide off the rim.

It is an object of the present invention to overcome the above difficulties of the prior art by the provision of a rim of this type in which the locking ring and the side ring will be securely held in place whether the tire is inflated or not and yet which may be readily removed when necessary. A further object is to devise a modified form of the invention disclosed in my co-pending Patent No. 1,880,403 granted October 4, 1932.

The above and other objects of the invention are achieved by the apparatus illustrated in the accompanying drawings and described below, it being understood that the invention is not limited to the exact details thereof described and shown.

In the drawings:

Figure 2 is an enlarged sectional view taken on the line 2—2 of Figure 1;

Figure 3 is an enlarged sectional view taken on the line 3—3 of Figure 1;

Figure 4 is a view similar to Figure 3 but showing the locking ring sprung out; and Figure 5 is a detail section taken on the line 5—5 of Figure 2.

Figure 1:
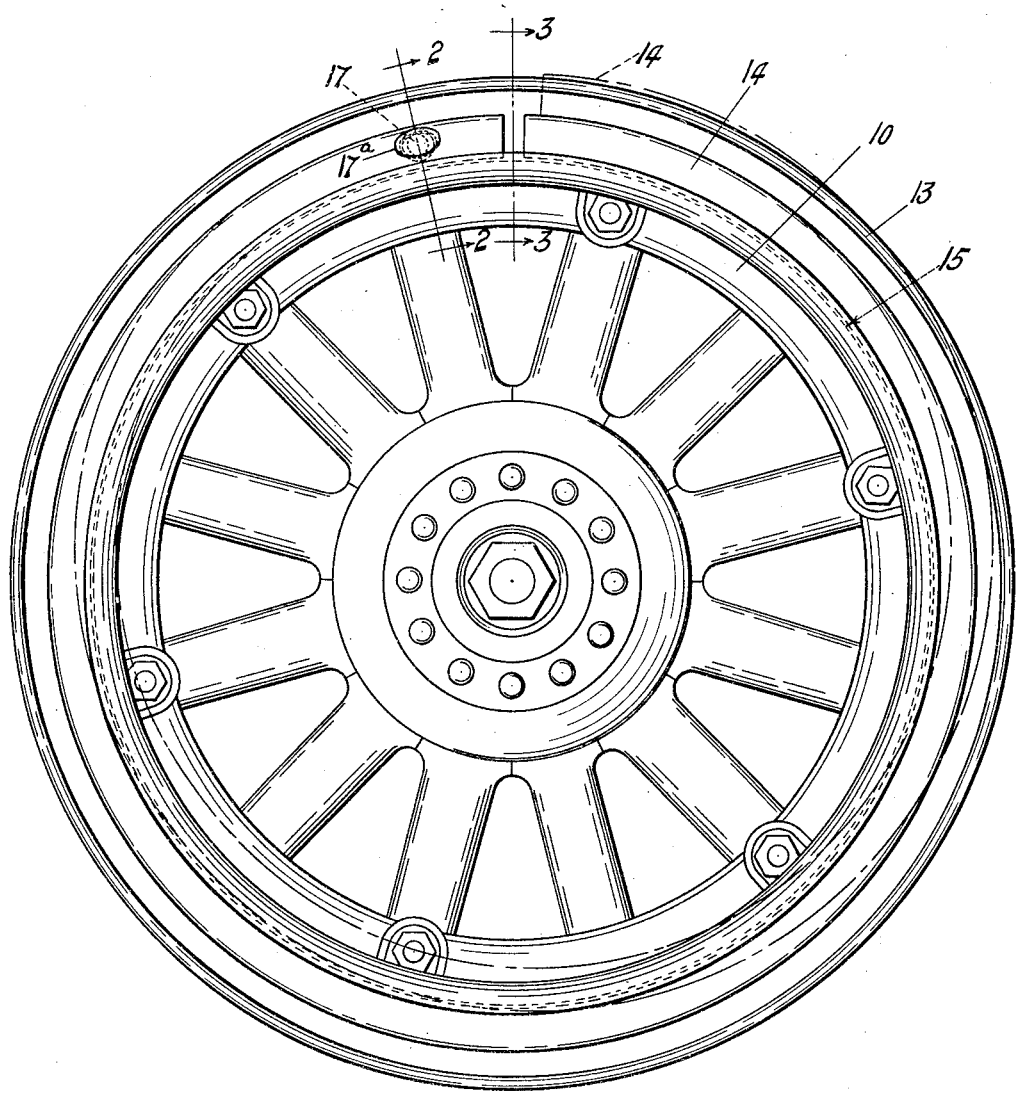
Figure 1 is a side elevation of a wheel equipped with a rim embodying the invention.

The numeral 10 indicates a wheel adapted to carry a rim 11 which may serve as the wheel felloe or which may be made demountable with respect to the wheel felloe as is well understood in the art.

The rim 11 is adapted to receive a pneumatic tire, the bead portion thereof being indicated at 12, which tire is held in place on the rim by an endless side ring 13. The side ring 13 is prevented from moving laterally off the rim by a split locking ring 14 removably received in a circumferential gutter 15 provided at the edge of the rim. The gutter 15 is formed with an overhang 15ª beneath which a rib 14ª of the locking ring seats when the tire 12 is inflated. A clearance, indicated at 16 is provided between the locking ring 14 and the gutter 15 so that when the tire 12 is deflated and the side ring 13 and tire are pushed laterally over the rim base, the locking ring may be sprung out of the gutter 15.

One end of the locking ring is secured to the side ring 13 by a rivet 17 which may be integral with the side ring and which rivet has an elliptical shank, preferably fitting loosely in an elliptical hole 18 in the locking ring. As shown in Figures 1 and 2 the head 17ª of the rivet is also elliptical and the rivet is of such a length that there will be a clearance 19 between the head 17ª and the locking ring 14.

In the operation of removing the tire 12 from the rim 11 the tire is first deflated and the side ring 13 and tire are forced over until further movement sideways is prevented by the means 17 securing the end of the locking ring to the side ring. With the various parts in this position the locking ring will not spring out by itself but the unsecured end thereof can be lifted and the locking ring thus pulled out of the rim gutter 15 approximately three-quarters of the way around the wheel. The loose connection between the side ring and locking ring permits limited pivotal movement of the latter and facilitates this operation. The portion of the side ring 13 diametrically opposite the fastening means 17 is now gripped and pulled off the rim, swinging on an arc about the portion of the locking ring still in the rim gutter 15. The side ring may now be moved radially of the wheel axis and rim to carry the end of the locking ring secured thereto out of the rim gutter 15 whereby the side ring and locking ring will be completely removed from the rim. The tire 12 may now readily be slid off the rim. The side ring and locking ring are maintained in substantial concentric relation when removed from the rim owing to the limitation of their relative pivotal movement.

The operation is just reversed when the tire is placed back on the rim. The portion of the locking ring and side ring secured together is first inserted in the rim gutter by moving the locking ring radially into the rim gutter and then swinging the remainder of the side ring about the portion already in place onto the rim. The locking ring is now snapped down into the rim gutter throughout its entire length and the tire is ready for inflation. The outward movement of the sidewalls of the tire due to the inflation pressure forces the side ring and locking ring out to the position shown in Figure 2 of the drawings where they are securely locked by the cooperation of the locking ring and the rim gutter.

With the present construction if the tire should go flat while in operation, the side ring can only move inward on the rim a distance limited by the rivet 17 securing it to one end of the locking ring. The locking ring will not be able to jump out of the rim gutter in this position, thus the side ring cannot move outwardly off the rim and the tire will be retained on the rim even when the tire is run deflated.

As many changes could be made in the construction particularly with respect to the exact portions of the locking ring secured to the side ring and the specific shapes of the rim gutter and locking ring, it is intended that all matter contained in the above description or shown in the accompanying drawings shall be interpreted as illustrative only and not in a limiting sense. Accordingly, various modifications of the invention can be resorted to without departing from the spirit of the invention or the scope of the appended claims.

What is claimed is:

1. A rim construction including a rim base formed with a circumferential side gutter, a side ring slidable on said rim base over said gutter, a split locking ring removably cooperating with said gutter and normally preventing lateral movement of said side ring off said rim, and means loosely securing said locking ring to said side ring to hold the rings in substantial concentric relation when disengaged from said rim, said means being constructed to permit limited relative lateral movement of said side ring with respect to said split locking ring.

2. A rim construction including a rim base formed with a circumferential side gutter, a side ring slidable on said rim base over said gutter for retaining a tire on said rim, a split locking rim removably cooperating with said gutter and normally preventing lateral movement of said side ring off said rim, and means loosely securing a portion of said locking ring to said side ring, said last-named means including an oval-shaped rivet fixed in said side ring and fitting loosely in an oval hole in the locking ring, whereby limited pivotal movement of the two parts is obtainable to hold the rings in substantial concentric relation when disengaged from said rim.

3. A rim construction including a rim base formed with a circumferential side gutter, a side ring slidable on said rim base over said gutter, a split locking ring removably cooperating with said gutter and normally preventing lateral movement of said side ring off said rim, said locking ring being formed with a circumferential ledge for radially supporting said side ring, and means loosely securing a portion of said locking ring to said side ring and permitting limited relative lateral and angular movement of the two parts, said last-named means including a rivet fixed in said side ring and fitting loosely in a hole in the locking ring, said means serving to hold the rings in substantial concentric relation when disengaged from said rim and to prevent the setting up of a binding stress between the side ring and locking ring to permit the side ring to seat properly on said locking ring ledge.

4. A rim construction including a rim base formed with a circumferential side gutter, a side ring slidable on said rim base over said gutter, a split locking ring removably cooperating with said gutter and normally preventing lateral movement of said side ring off said rim, and means loosely securing a portion of said locking ring to said side ring, said last-named means including a headed rivet fixed in said side ring and fitting loosely in a hole in the locking ring, whereby relative movement of the two parts is obtainable to prevent the setting up of a binding stress between the side ring and locking ring.

In witness whereof, I have hereunto affixed my signature this 1st day of August, 1932.

WINFIELD S. BRINK.